March 9, 1948. H. M. PARKER 2,437,476
DIFFERENTIAL TWIN CHAMBER NEUTRON METER
Filed July 8, 1944
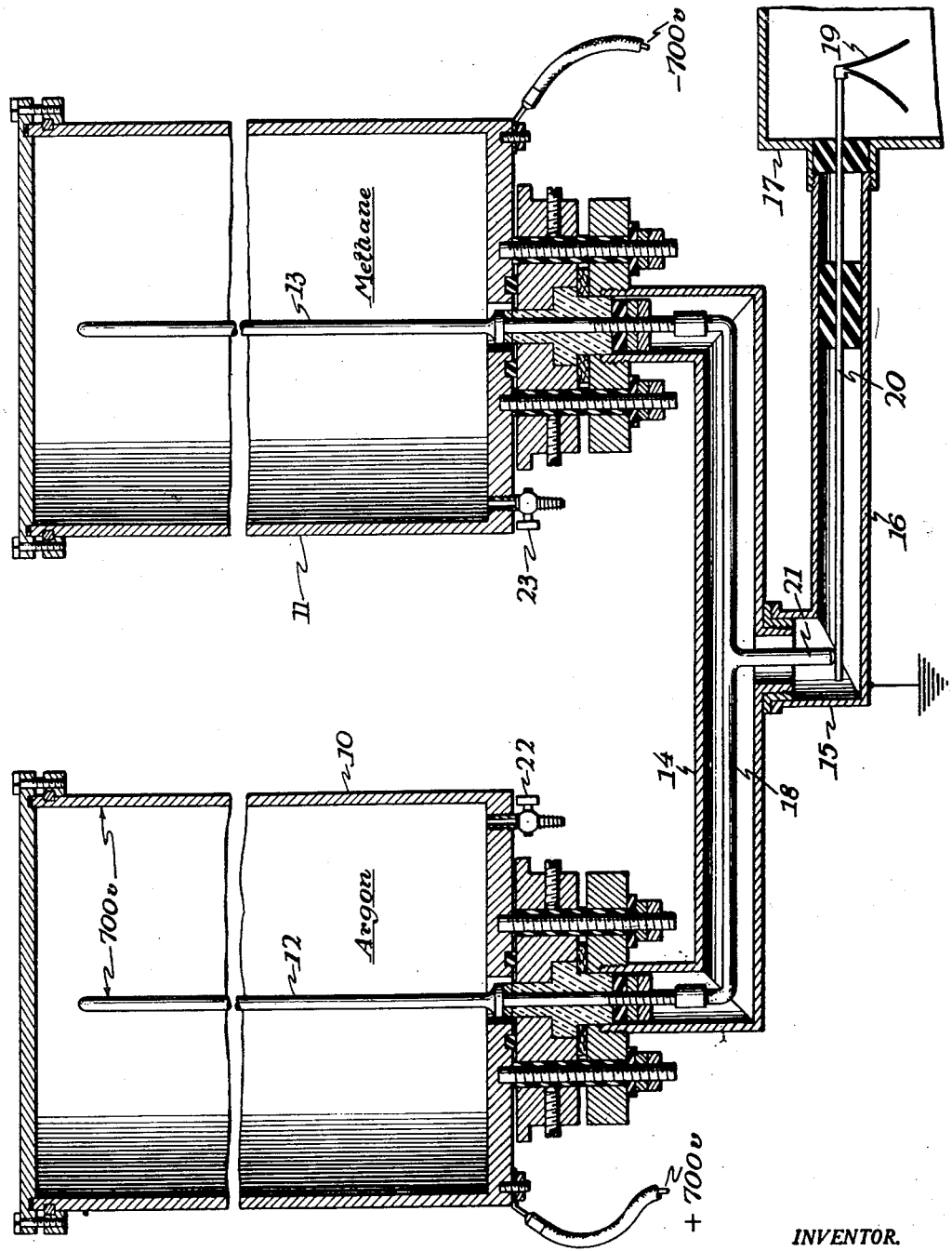
INVENTOR.
Herbert M. Parker
BY
ATTORNEY.

Patented Mar. 9, 1948

2,437,476

UNITED STATES PATENT OFFICE 2,437,476

DIFFERENTIAL TWIN CHAMBER NEUTRON METER

Herbert M. Parker, Oak Ridge, Tenn., assignor to the United States of America, as represented by the Atomic Energy Commission Application July 8, 1944, Serial No. 544,109

4 Claims. (Cl. 250—83.6)

This invention relates to a method and apparatus for measuring neutrons and more particularly for measuring neutron intensity in the presence of other radioactivity and especially gamma ray activity.

An object of the invention is to provide a method the practice of which cancels out the effect of background activity such as gamma radiation.

Another object of the invention is the provision of a method and apparatus using spaced ionization chambers which are adapted to be interchanged in position for successive readings, whereby directional effects are made evident and can be eliminated from the final reading.

Other objects and advantages of the invention will become apparent from the following description when read in connection with the accompanying drawing the single figure of which shows in elevation and partly in section one embodiment of the invention.

As shown in the drawing two ionization chambers 10 and 11 having collecting electrodes 12 and 13, respectively, are mounted on opposite ends of a tubular member 14 supported at its midpoint by an upturned end 15 of a second tubular member 16 extending from and carried by a structure 17 which preferably comprises the casing of an instrument box. It will be understood that the chamber casings 10 and 11 are individually electrically isolated and that the collecting electrodes 12 and 13 are connected together as by a rod 18 and to a suitable indicating means 19, shown as the leaves of an electroscope, through a rod 20 which makes bearing contact with the end of a rod 21 depending from rod 18.

In accordance with the invention the chamber 10 is filled with a gas such as argon which is ionized by gamma radiation but in which substantially no ionization results from neutron bombardment. The chamber 11 is filled with a suitable gas rich in hydrogen such as methane or ethylene under pressure so that it will be ionized by neutrons via proton recoil. The gases in the two chambers are adjusted in pressure so as to have equal ionization for equal gamma ray excitation. This is preferably accomplished by first filling chamber 11 with say methane to a pressure of sixty pounds per square inch. The chamber 10 is then filled with argon, both chambers exposed equally to high energy gamma radiation, and the pressure of the argon in the chamber 10 adjusted until the ionization produced in the chamber 10 equals that produced in the chamber 11. When the two chambers 10 and 11 have equal volumes, it has been found that with the methane at a pressure of sixty pounds, the pressure of the argon necessary to give equal ionization is in the neighborhood of forty pounds. The chambers 10 and 11 may be evacuated and filled through suitable valves 22 and 23, respectively.

In order that the ionization brought about by neutron bombardment alone affects the measuring instrument 19, the collecting fields of the chambers 10 and 11 are made of opposite sign by connecting them respectively to the positive and negative terminals of a voltage source not shown. Thus the ionization current produced by gamma radiation is equal and opposite in the two chambers and the instrument 19 is affected only by the ionization produced in the chamber 11 by neutrons. Thus the instrument 19 indicates neutron intensity and when calibrated may be read by means of a microscope (not shown) in the usual manner.

Spaced chambers as above described are very sensitive to directional effects and unless great care is exercised the reading will be inaccurate by an unknown amount due to unequal intensity distribution of the gamma radiation. A very important feature of this invention is the provision for compensating this directional or parallax defect. This is done by making it possible to interchange in position the two chambers 10 and 11 so that two readings taken 180° out of phase will each contain the directional error but of opposite sign so that by subtracting one of these readings from the other, a measure of the directional error may be obtained. Either of the readings may then, of course, be corrected for the directional error. The two 180° out of phase readings may conveniently be obtained by making the mounting between the tube 14 and its supporting tube 15 free for rotation as shown. As thus constructed the two chambers 10 and 11 can be rotated about an axis midway between them and for each 180° rotation the two chambers interchange positions.

While for the purpose of explaining the invention a preferred construction has been illustrated and described, it is to be understood that the invention is not limited thereto but includes those modifications and variations which will readily suggest themselves to those skilled in the art.

I claim:

1. In combination, two spaced ionization chambers equally responsive to gamma radiation and unequally responsive to neutron radiation, and means supporting said chambers for rotation about an axis midway between said chambers so that upon being rotated 180° the two chambers mutually interchange positions, whereby differences in gamma ray ionization due to directional effects undergo a change in sign for each 180° of rotation.

2. In the art of measuring fast neutrons in the presence of strong gamma radiation by means of two spaced differential ionization chambers equally responsive to gamma radiation and unequally responsive to neutron radiation the method of compensating for directional effects which comprises measuring the ionization produced in each of the two chambers when in one position, measuring the ionization produced in each of the two chambers when their positions are interchanged, and noting the difference in ionization between the two chambers in each of the two positions.

3. In the art of measuring fast neutrons in which spaced differentially connected ionization chambers cancel out background ionization caused by other than fast neutrons the method of determining the difference in background ionization in the two chambers due to parallax which comprises measuring the difference in the ionization in the two chambers, interchanging the chambers in position, measuring the ionization difference in the new positions, and noting the discrepancy between the two differences.

4. A differential twin chamber neutron meter comprising two spaced ionization chambers mounted for rotation about an axis midway between the two chambers whereby they may readily be interchanged in position, both of said chambers being substantially equally responsive to gamma radiation and one only of said chambers being responsive to neutron bombardment.

HERBERT M. PARKER.

REFERENCES CITED

The following references are of record in the file of this patent:

UNITED STATES PATENTS

| Number | Name | Date |
|---|---|---|
| 2,097,760 | Failla | Nov. 2, 1937 |
| 2,349,753 | Pontecorvo | May 23, 1944 |